April 10, 1951

P. HEFTLER 2,547,941

METAL-EDGE FILTER STACK WASHER

Filed Feb. 1, 1946

SECTION A-A

SECTION B-B

INVENTOR

Paul Heftler

April 10, 1951 P. HEFTLER 2,547,941
METAL-EDGE FILTER STACK WASHER
Filed Feb. 1, 1946 2 Sheets—Sheet 2

SECTION C-C

SECTION D-D

INVENTOR
Paul Heftler

Patented Apr. 10, 1951

2,547,941

UNITED STATES PATENT OFFICE 2,547,941

METAL-EDGE FILTER STACK WASHER

Paul Heftler, Chicago, Ill.

Application February 1, 1946, Serial No. 644,952

10 Claims. (Cl. 210—169)

The invention described and illustrated here is a kind of washer for metal-edge filter stacks whose principal advantage is that it can be made more cheaply than the washers of any other metal-edge filter stack. It is particularly useful in making filters of the general type shown in the Fulcher Patent No. 1,581,998, in which it is necessary that the means for spacing the rim of one washer from the rim of the next washer in the stack be spaced in from the edge of the rim so that the washer can be rotated with its rim between two scrapers without the spacing means (which rotates with the washer) hitting the scrapers.

Filter stacks can be made cheaply with this new kind of washer for three main reasons: (1) Each washer carries its own spacing means instead of there being separate spacers, so there are fewer parts to assemble; (2) The spacing means for each washer are formed from the central part of the washer instead of from a separate piece of metal, thus saving metal; and (3) The washer is designed so that every part of its outline and of the hole through it can be cut with circular punches, which are comparatively cheap to make and maintain, thus making the cost of making and maintaining the punches and dies less than it would otherwise be.

The drawings show two of the best forms of the invention. In the drawings.

Figure 1:
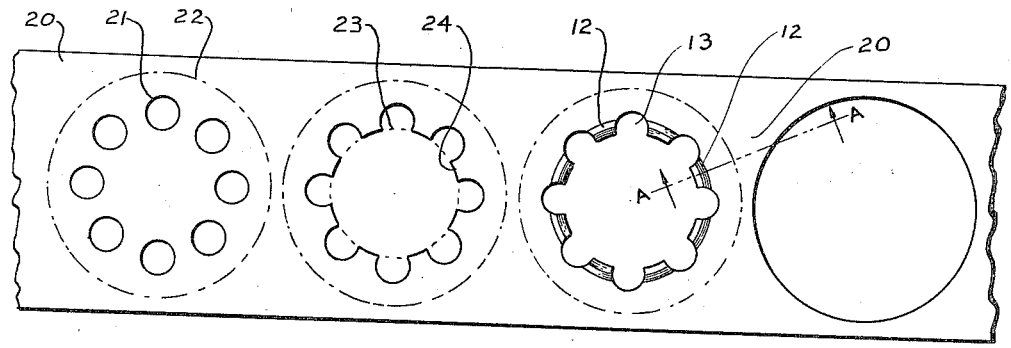
Fig. 1 is a plan view of a strip of stock showing the separate steps in making one form of the invention.
Figure 2:
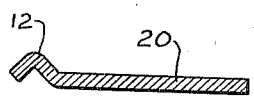
Fig. 2 is a section on the line A—A in Fig. 1 on an enlarged scale.
Figure 3:
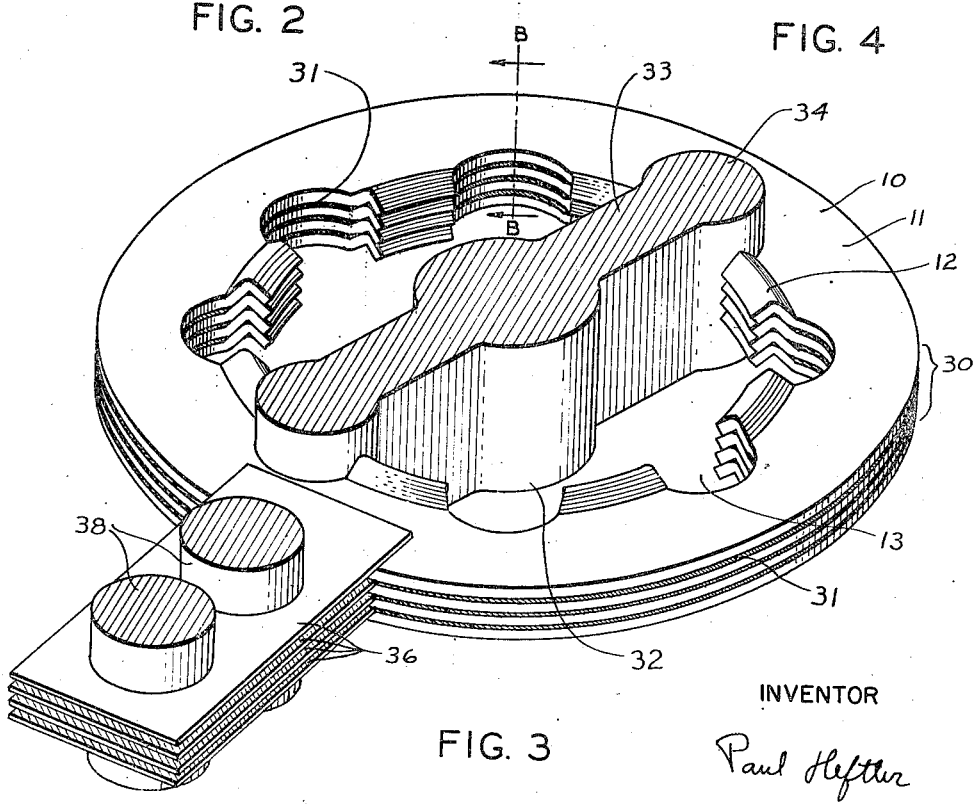
Fig. 3 is an isometric view, on an enlarged scale, of a part of a new filter whose washers were made by the steps shown in Fig. 1.
Figure 5:
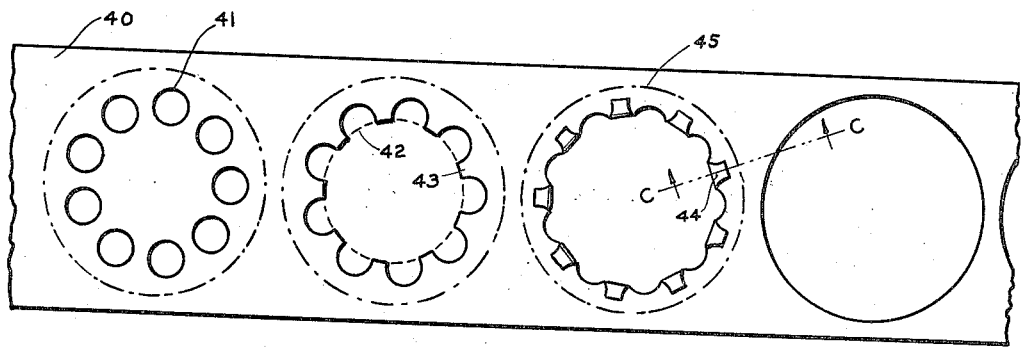
Fig. 5 is a plan view of a strip of stock showing the principal steps in making another form of the invention.
Figure 6:
Fig. 6 is a section on the line C—C in Fig. 5 on an enlarged scale.

In making the form of the invention shown in Fig. 3, each washer 10 is formed, as shown in Fig. 1, from a strip 20 of thin sheet metal stock in four successive operations:

(1) Punch a circle of small round holes 21 within the outline 22 of the future washer;

(2) Punch a large round hole 23 concentric with the circle of small round holes 21 and cutting into the inner side of each small round hole 21 (this leaves a large hole with a series of tongues 24 projecting in towards its center);

(3) Bend each of the tongues 24 up into an inverted V, as shown in Fig. 2, to form a spacer 12; and (4) Blank the washer out of the strip of stock.

Each finished washer 10 then consists of a flat smooth rim 11 of the same uniform thickness as the original stock 20 with a series of tongues 12 projecting in from its inner edge and also of the same thickness. However, since the metal of the tongues 12 lies at an angle to the plane of the washer, their thickness in the direction of the axis of the washer (which is perpendicular to that plane) is greater than the thickness of the metal measured straight through from one side to the other. For example, if the washer is formed of metal .010 inch thick, the axial thickness of the tongues will be $.010\sqrt{2}$ or .014 inch, assuming that the tabs are bent at 45° to the plane of the washer.

Figure 4:
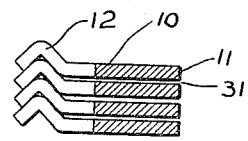
Fig. 4 is a section on the line B—B in Fig. 3.

The washers 10 are assembled into a filter stack 30 as shown in Figs. 3 and 4. They are placed one on top of another (only four are shown in the figures) with the bent tongues 12 of each washer nesting into the bent tongues 12 of the washer above it. Since the axial thickness of the tongues is greater than the axial thickness of the rims 11, the rims of successive washers will be spaced apart, leaving thin cracks or passages 31 extending in from the outside of the stack to the notches 13 between the tongues of each washer. If the washer has the shape and dimensions given above by way of example, the passages 31 between the rims of successive washers will be .014–.010 or .004 inch thick.

The washers 10 are held from shifting sideways or from turning out of line with each other by a central stem 32 which has two fins 33 with rounded edges 34 that fit into opposite notches in each washer. With such a stem, the washers 10 are made with an even number of spacing tongues 12, such as eight, ten, or twelve, so that there will be two notches directly opposite each other; however, it may be desirable to use a stem with three fins instead of two, in which case the washer would be made with six, nine, or twelve tongues.

Scrapers 36 are provided, projecting in between the flat rims of successive washers. The scrapers 36 are flat rectangular pieces of thin sheet metal each with two round holes punched in it. Thus, they can be made from a strip of stock of the right width by merely punching with two round punches and shearing or cutting off with a plain straight shear. Spacers can be placed between successive scrapers 36, the spacers being made in the same way as the scrapers but being shorter so that they do not reach the edges of the washers 10.

The scrapers 36 and their spacers, if spacers are used, are held on two fixed round rods 38, and the stem 32 which holds the washers is arranged so that it can be turned about its axis. When this is done, the edges or rims of the washers pass between the scrapers, and any particles of dirt lodged in the entrances to the slits between the washers are scraped off and fall to the bottom of the sump or chamber in which the filter stack is mounted. The details of the sump, the passages for bringing liquid to and from the filter stack, and the means for turning the stack are not shown or described here, since they can be as shown in the Fulcher patent mentioned above or as in the filters of this general type now on the market.

Figure 7:
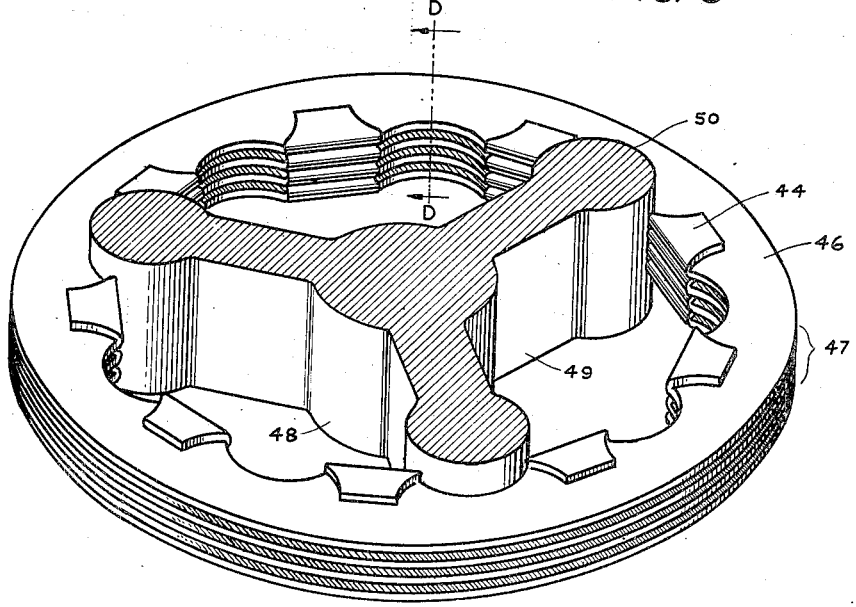
Fig. 7 is an isometric view, on an enlarged scale, of a part of a filter whose washers were made by the steps shown in Fig. 5.

The form of the invention shown in Fig. 7 is made in much the same way as the form shown in Fig. 3 and described above. A circle of small holes 41 is punched in the stock 40, and then a single large hole 42 is punched in the middle of the small holes so as to cut into them and form the tongues 43. However, the tongues 43, instead of being crimped up into an inverted V shape, are bent up and out and back down onto the stock 40 to form spacers 44. This bending is done in several steps, but the intermediate steps have been omitted from the drawing in order to simplify it.

The washer is finished by blanking it out of the stock on the circle 45, and four of the finished washers 46 are shown assembled into a part of a stack 47 in Fig. 7. Here the washers are held from shifting sideways or from turning out of line with each other by a central stem 48, which has three equally-spaced fins 49 with rounded edges 50 that fit into notches on the inner edges of the washers.

Figure 8:
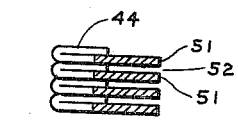
Fig. 8 is a section on the line D—D in Fig. 7.

In this form of the invention, the rims 51 of the washers 46 are spaced apart by the full thickness of the stock from which the washers are formed, as shown in Fig. 8. However, the width of the slits 52 between the rims of the washers can be made just as small as in the first form of the invention because thinner stock can be used.

Besides the forms of the invention described above, the invention, in its broader aspects, may be carried out in other ways, some of which will be obvious to the skilled engineer and others of which may involve further invention. Some examples are shown in Figs. 7 to 12 of my Patent No. 2,260,899. In view of this, the invention includes not only what I have described and shown but any construction that falls within any of the following definitions or claims.

I claim:

1. A washer for a metal-edge filter stack, the washer being a round ring of thin sheet metal with tongues attached to its inner edge and bent to form spacers, the spacers being all a distance in from the outer edge of the ring so that the washer can be turned around and around without stopping past scrapers touching both sides of the ring, the shape of the washer being such that, if the tongues were unbent, the inner edge of the washer would be formed entirely by a series of concave circular arcs of short radius and large angle and a series of concave concentric circular arcs of long radius and small angle, the short-radius arcs forming the sides of the tongues and the inner edge of the washer between the tongues, and the long-radius arcs joining the ends of successive short-radius arcs and forming the ends of the tongues, so that the finished washer can be made by punching and blanking sheet metal with nothing but circular punches and dies and by bending.

2. A washer as defined in claim 1 and in which each tongue has two separate bends, the first bend being near the ring and being a bend out of the plane of the ring and less sharp than a right angle, and the second bend being a bend back toward the plane of the ring and twice as sharp as the first bend.

3. A washer for a metal-edge filter stack, the washer being a round piece of thin sheet metal with a flat rim partly bounded on the inside by edges of the metal cut on concave circular arcs spaced apart so as to leave tongues of metal attached to the inner edge of the rim, the tongues being bent out of the plane of the rim to form spacers, the shape of the washer being such that, if the tongues were flattened out, the inner edges of the washer would be formed entirely by concave circular arcs (including those arcs already mentioned), so that the finished washer can be made by punching and blanking sheet metal with nothing but circular punches and dies and by bending the tongues.

4. A washer for a metal-edge filter stack, the washer being a piece of thin sheet metal with a hole, a part of the edge of the hole being formed by concave circular arcs of short radius spaced apart enough to leave tongues of metal between them, the remainder of the edge of the hole being formed by other concave circular arcs, the successive arcs meeting each other only in angles pointing towards the hole, and the tongues being bent out of the plane of the rest of the washer to form spacers.

5. A washer for a metal-edge filter stack, the washer being a round piece of thin sheet metal with a single hole, the hole in it being of such a shape that the washer has a rim and a series of tongues attached to the inside edge of the rim, the tongues being bent out of the plane of the rim to form spacing portions of the washer with a greater axial thickness than the rim, and all the spacing portions being a distance in from the outer edge of the rim so that the washer can be turned around and around without stopping past scrapers that touch both sides of the rim.

6. A washer for a metal-edge filter stack, the washer being a round piece of thin sheet metal with a flat rim partly bounded on the inside by edges of the metal cut on circular arcs spaced apart so as to leave tongues of metal attached to the inner edge of the rim, the tongues being bent out of the plane of the rim to form spacers.

7. A washer as defined in claim 1 and in which each tongue is bent back flat upon the rim to make a spot where the washer is twice as thick as the sheet metal that forms it.

8. A washer for a metal-edge filter stack, the washer being formed of thin sheet metal and having a rim with a series of tongues on its inner edge, the tongues being bent out of the plane of the rim to form spacing portions of the washer with a greater axial thickness than the rim, and all the spacing portions being a distance in from the outer edge of the rim so that, when a number of such washers are placed one on top of another in a stack, slots will be formed on the surface of the stack between the rims of successive washers, and these slots will each go all the way around the stack.

9. A washer as defined in claim 8 and in which each tongue has two separate bends, the first bend being near the rim and being a bend out of the plane of the ring and less sharp than a right angle, and the second bend being a bend back towards the plane of the ring and twice as sharp as the first bend.

10. A washer as defined in claim 8 and in which each tongue is bent back flat upon the rim to make a spot where the washer is twice as thick as the sheet metal that forms it.

PAUL HEFTLER.

REFERENCES CITED

The following references are of record in the file of this patent:

UNITED STATES PATENTS

| Number | Name | Date |
|---|---|---|
| 990,861 | Hamill | May 2, 1911 |
| 1,657,346 | Cuno | Jan. 24, 1928 |
| 2,159,196 | Babitch | May 23, 1939 |
| 2,184,243 | Belyavin | Dec. 19, 1939 |
| 2,260,899 | Heftler | Oct. 28, 1941 |
| 2,283,629 | Heftler | May 19, 1942 |

FOREIGN PATENTS

| Number | Country | Date |
|---|---|---|
| 327,663 | Italy | July 17, 1935 |
| 334,569 | Great Britain | Sept. 8, 1930 |
| 461,162 | Germany | June 13, 1928 |